United States Patent
Schubert et al.

(10) Patent No.: US 10,591,656 B1
(45) Date of Patent: Mar. 17, 2020

(54) PASSIVE LUMINESCENT ILLUMINATOR

(71) Applicant: X Development LLC, Mountain View, CA (US)

(72) Inventors: Martin F. Schubert, Mountain View, CA (US); Eric H. C. Liu, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 369 days.

(21) Appl. No.: 15/087,190

(22) Filed: Mar. 31, 2016

(51) Int. Cl.
*A01G 9/20* (2006.01)
*A01G 22/00* (2018.01)
*F21V 8/00* (2006.01)
*F21S 11/00* (2006.01)
*G02B 19/00* (2006.01)
*A01G 33/00* (2006.01)
*A01G 31/02* (2006.01)
*A01G 7/04* (2006.01)
*F21W 131/40* (2006.01)

(52) U.S. Cl.
CPC ............. *G02B 6/0003* (2013.01); *A01G 7/04* (2013.01); *A01G 9/20* (2013.01); *A01G 22/00* (2018.02); *A01G 31/02* (2013.01); *A01G 33/00* (2013.01); *F21S 11/007* (2013.01); *G02B 6/0008* (2013.01); *G02B 19/0019* (2013.01); *G02B 19/0042* (2013.01); *F21W 2131/40* (2013.01)

(58) Field of Classification Search
CPC .......... G02F 2001/01791; G02F 2001/133614; G02F 1/1336; G02F 1/017; A01G 22/00; A01G 1/001; A01G 7/04; A01G 9/20; A01G 31/02; A01G 33/00; G02B 6/0008; G02B 6/0003; G02B 19/0019; G02B 19/0042; F21S 11/007; F21W 2131/40
See application file for complete search history.

(56) References Cited

U.S. PATENT DOCUMENTS

| | | | | |
|---|---|---|---|---|
| 4,198,953 A | * | 4/1980 | Power | A01G 9/243 126/617 |
| 4,411,490 A | * | 10/1983 | Daniel | F21S 11/00 126/648 |
| 4,539,625 A | * | 9/1985 | Bornstein | F21S 11/00 362/145 |
| 4,761,716 A | * | 8/1988 | Mori | F21S 11/00 359/591 |
| 4,815,815 A | * | 3/1989 | Mori | A01K 75/02 362/1 |
| 4,884,860 A | * | 12/1989 | Brown | F21S 9/02 385/27 |
| 6,059,438 A | | 5/2000 | Smith et al. | |

(Continued)

*Primary Examiner* — Arman B Fallahkhair
(74) *Attorney, Agent, or Firm* — Christensen O'Connor Johnson Kindness PLLC

(57) ABSTRACT

A passive illuminator includes a luminescent region with a semiconductor material that absorbs first photons having energy greater than or equal to a threshold energy. In response to absorbing the first photons, the semiconductor material emits second photons, through a spontaneous emission process, having less energy than the first photons. A waveguide is optically coupled to the luminescent region to transport the second photons a distance from the luminescent region. An extraction region optically coupled to the waveguide to emit the second photons, and the waveguide is disposed between the extraction region and the luminescent region.

24 Claims, 9 Drawing Sheets

(56) References Cited

U.S. PATENT DOCUMENTS

| | | | | |
|---|---|---|---|---|
| 6,272,265 | B1* | 8/2001 | Franklin | F21S 11/00 |
| | | | | 362/551 |
| 8,156,685 | B2* | 4/2012 | Kleinwaechter | A01G 9/1438 |
| | | | | 47/17 |
| 8,551,769 | B2* | 10/2013 | Falber | A01G 33/00 |
| | | | | 252/586 |
| 8,736,961 | B2* | 5/2014 | Lydecker | F21S 11/00 |
| | | | | 359/591 |
| 9,075,008 | B2* | 7/2015 | Holland | G01J 3/10 |
| 9,921,397 | B2* | 3/2018 | Jaster | G02B 19/0042 |
| 10,114,165 | B1* | 10/2018 | Heinrich | G02B 6/0065 |
| 2013/0042523 | A1* | 2/2013 | Lee | A01G 9/22 |
| | | | | 47/17 |
| 2019/0150382 | A1* | 5/2019 | Luzuriaga | A01G 33/00 |
| 2019/0183059 | A1* | 6/2019 | Yun | A01G 9/243 |

* cited by examiner

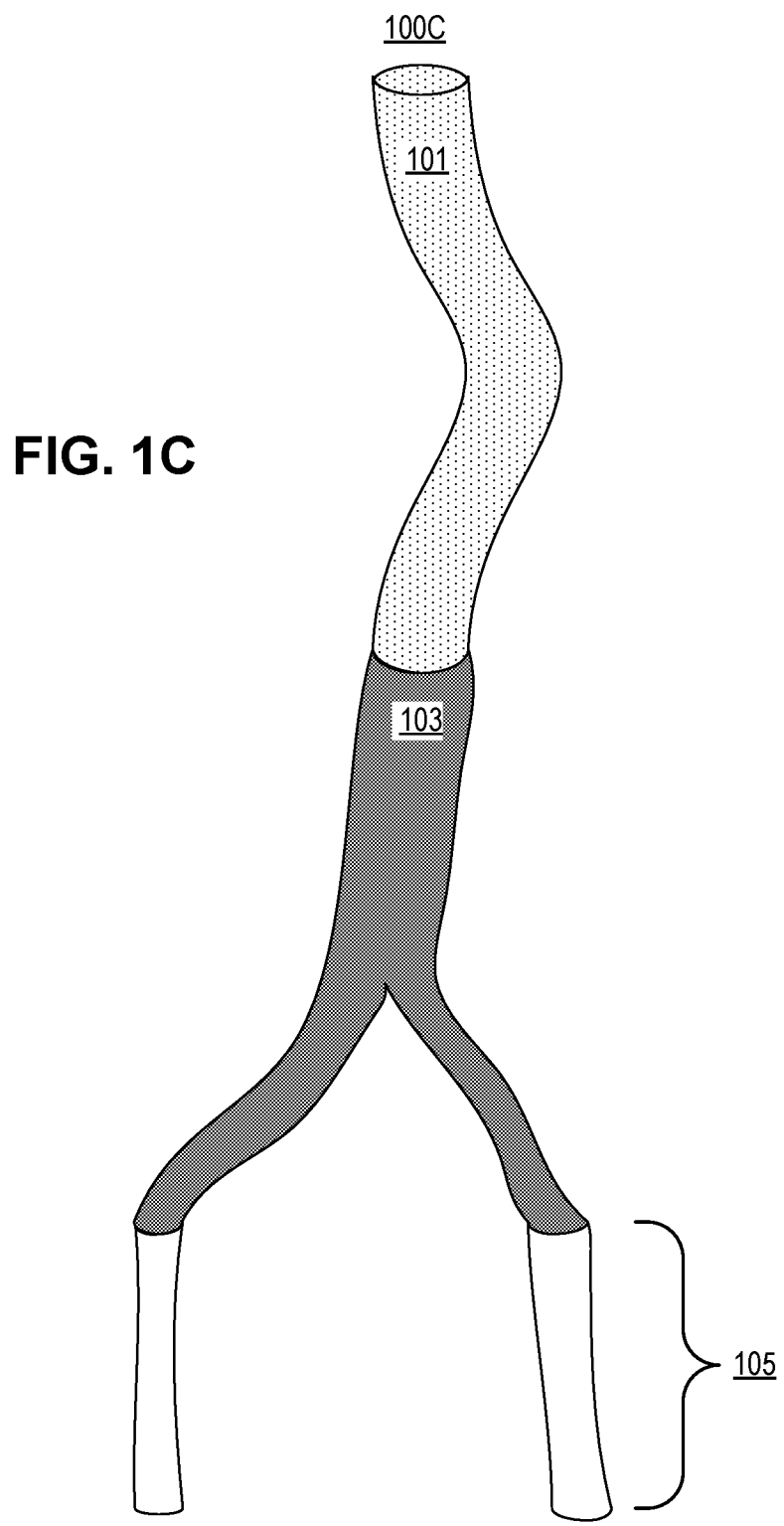

PASSIVE LUMINESCENT ILLUMINATOR

TECHNICAL FIELD

This disclosure relates generally to wavelength conversion, and in particular but not exclusively, relates to passive luminescent illumination.

BACKGROUND INFORMATION

Vertical farming is a method of producing plants in stacked layers. Vertical farming generally utilizes controlled growing environments where factors like light, moisture, temperature, humidity, concentration of gasses, etc. are fastidiously maintained to optimize plant growth. This horticultural technique has the potential to revolutionize the way we produce and consume food by allowing for ultra-high density farming in urban environments.

Unlike traditional agriculture, indoor farming allows for production of crops year-round. All season farming may boost productivity of the farmed space by a factor of four or more depending on the crop being farmed. Not only can vertical farming practices produce more food per square foot, but can also mitigate major problems in agriculture such as spoilage/poor-freshness, shipping (both associated pollution and costs), and contamination.

However, many question the profitability of vertical farming. The costs of lighting, heat, power, etc. may negate any savings resulting from reduced transportation expenses. Furthermore, depending on the type of power used (e.g., coal, nuclear, hydroelectric, etc.), a vertical farm may produce more greenhouse gasses per plant than conventionally grown produce.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIG. 1C is an illustration of a passive luminescent illuminator, in accordance with an embodiment of the disclosure.

DETAILED DESCRIPTION

Embodiments of an apparatus and method for passive luminescent illumination are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It should be noted that the word "plant" in this disclosure refers to any photosynthetic organism including microalgae, and organisms that exhibit photofermentation.

Figure 1A:
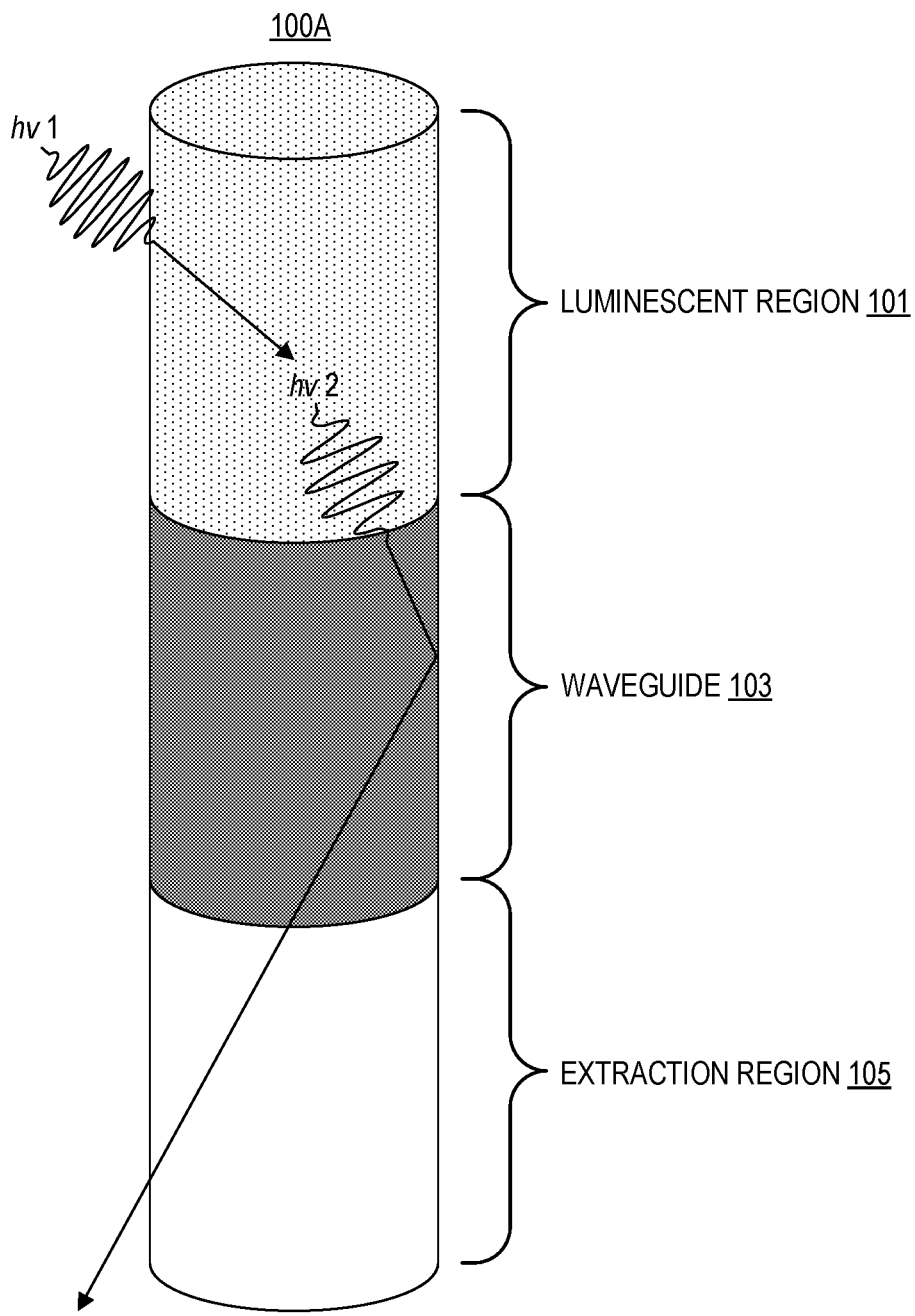
FIG. 1A is an illustration of a passive luminescent illuminator, in accordance with an embodiment of the disclosure.

FIG. 1A is an illustration of passive luminescent illuminator 100A, in accordance with an embodiment of the disclosure. Passive luminescent illuminator 100A includes: luminescent region 101, waveguide 103, and extraction region 105. Luminescent region 101 includes a semiconductor material that absorbs first photons having energy greater than or equal to a threshold energy. In one embodiment, the first photons include sunlight, and the threshold energy is equal to a bandgap energy of the semiconductor material. In response to absorbing the first photons, the semiconductor material emits second photons through a spontaneous emission process, and the second photons have less energy than the first photons. Waveguide 103 is optically coupled to luminescent region 101 to transport the second photons a distance from the luminescent region. In one embodiment, the distance may be several inches, while in other embodiments the distance may be several hundred feet (or any distance in between). Extraction region 105 is optically coupled to waveguide 103 to emit the second photons, and waveguide 103 is disposed between extraction region 105 and luminescent region 101. In the depicted embodiment, luminescent region 101 is connected to waveguide 103 and waveguide 103 is connected to extraction region 105.

In one embodiment, luminescent region 101 includes a transparent matrix with semiconductor particles disposed in the transparent matrix. In another or the same embodiment, waveguide 103 and extraction region 105 may also include the same transparent matrix (without the semiconductor particles) such that the bulk of passive luminescent illuminator 100A is made from one continuous piece of material. However, in other embodiments, pieces of passive luminescent illuminator 100A may be made from different materials. For example, luminescent region 101 may be made from glass while waveguide 103 and extraction region 105 are made from polymers (or vice versa). As shown, each region (i.e., luminescent region 101, waveguide 103, and extraction region 105) may be its own discrete entity, and each region may be longer than it is wide.

In the depicted embodiment, the semiconductor material in luminescent region 101 includes semiconductor particles (more specifically quantum dots such as CdSe, CdSeZn, CdSeS, CdTe, and PbS quantum dots). However, in other embodiments, the semiconductor material may include other materials such as: organic small molecule/polymer dyes, giant shell-core quantum dots (including group II-VI or III-V compounds/elements), dot-in-rod quantum dots (including group II-VI or III-V compounds/elements), rare-earth-doped quantum dots/nanocrystals, chalcogenides, group four elements (e.g., C, Si, Ge, Sn, etc.), group 3 elements (B, Al, Ga, In, etc), group 5 elements (N, P, As, Sb etc.), or the like. One skilled in the relevant art will appreciate that the materials listed above are not exhaustive and can be combined in any manner. Other material compositions not disclosed may also be used to achieve the results described herein.

In several embodiments, the semiconductor particles have a plurality of bandgap energies and emit second photons with a plurality of wavelengths. In these embodiments, one or more of the aforementioned structures and/or materials may be used in combination to tailor the emission spectrum of the semiconductor material to specific applications such as agriculture or the like.

In one embodiment, waveguide 103 exhibits total internal reflection to guide the second photons from luminescent region 101 to extraction region 105. In some of these embodiments, waveguide 103 may also have a reflective material (depicted) disposed on a surface of waveguide 103. The reflective material may be opaque and prevent second photons (that do not satisfy the conditions for total internal reflection) from escaping waveguide 103. This may further enhance the efficiency of light transfer from luminescent region 101 to extraction region 105.

In the depicted embodiment, passive luminescent illuminator 100A is columnar with a cross section that is circular or oval. However, in other embodiments, passive luminescent illuminator 100A may be columnar but with a cross section that is triangular, square, rectangular, hexagonal, octagonal, or the like.

Figure 1B:
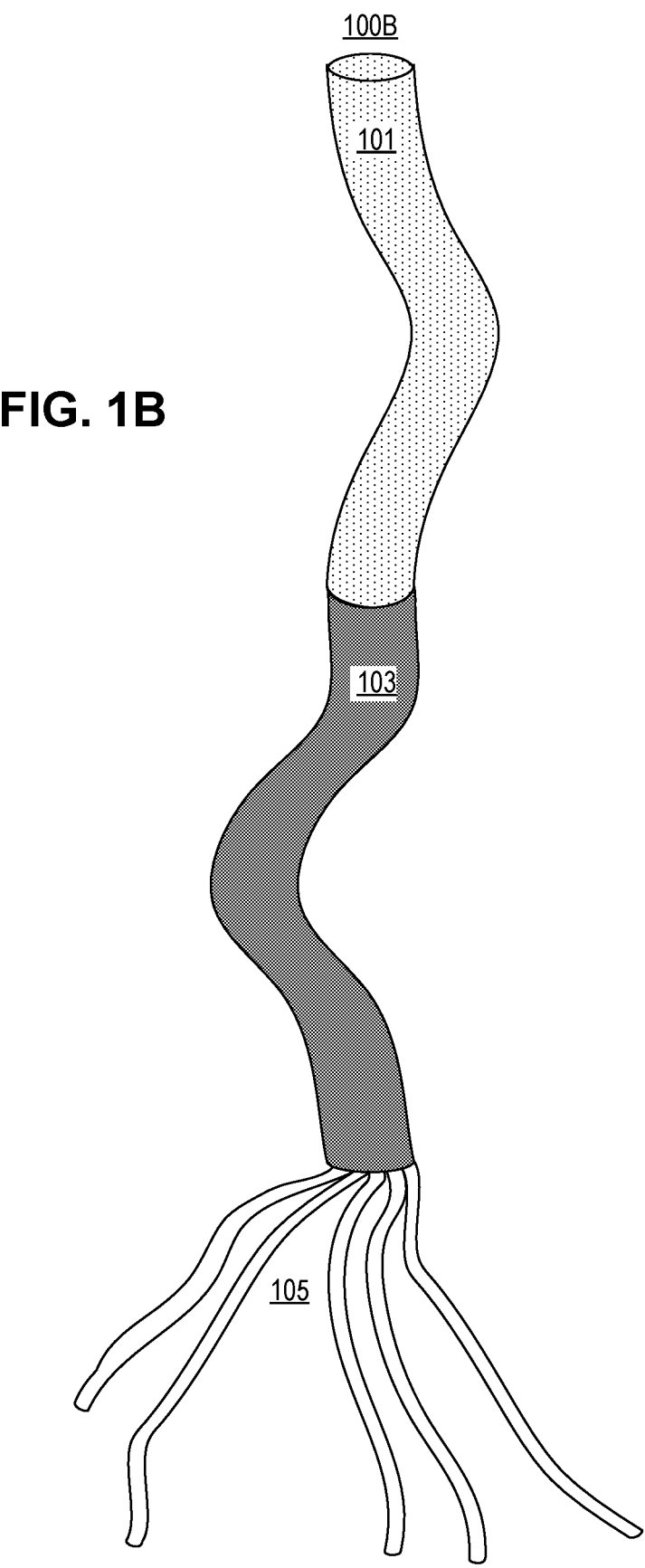
FIG. 1B is an illustration of a passive luminescent illuminator, in accordance with an embodiment of the disclosure.

FIG. 1B is an illustration of passive luminescent illuminator 100B, in accordance with an embodiment of the disclosure. Passive luminescent illuminator 100B is similar in many respects to passive luminescent illuminator 100A in FIG. 1A, with several noteworthy distinctions. As shown, luminescent illuminator 100B includes a plurality of extraction regions 105 disposed to extract light from waveguide 103 in a plurality of locations. Additionally, luminescent illuminator 100B is flexible which allows it to be bent for easy handling/installation.

As shown, all components of luminescent illuminator 100B are substantially columnar but deformed due to the bending/flexing of luminescent illuminator 100B. In other words, luminescent region 101 and waveguide 103 are relatively cylindrical, and the plurality of extraction regions 105 are also each relatively cylindrical. However, in other embodiments, luminescent illuminator 100B may have a highly branched or dendritic structure to facilitate the transfer of light into many locations. Furthermore, in some embodiments, luminescent illuminator 100B may be highly deformable/elasic such that, post deformation, the original shape of luminescent illuminator 100B is unrecognizable.

FIG. 1C is an illustration of passive luminescent illuminator 100C, in accordance with an embodiment of the disclosure. Passive luminescent illuminator 100C is similar in many respects to passive luminescent illuminator 100B in FIG. 1B, with several noteworthy distinctions. As depicted, passive luminescent illuminator 100C includes a plurality of waveguides 103 and a plurality of extraction regions 105. One waveguide 103 separates into two waveguides 103 midway along the optical path. However, in other embodiments not depicted, there may be a plurality of luminescent regions 101 coupled to a singular waveguide 103 and singular extraction region 105, or alternatively, a plurality of luminescent regions 101 coupled to a singular waveguide 103 and a plurality of extraction regions 105. Although the cross sections of passive luminescent illuminator 100C are substantially circular, in other embodiments, passive luminescent illuminator 100C may include flat rectangular panels with reflectorized edges.

Figure 1D:
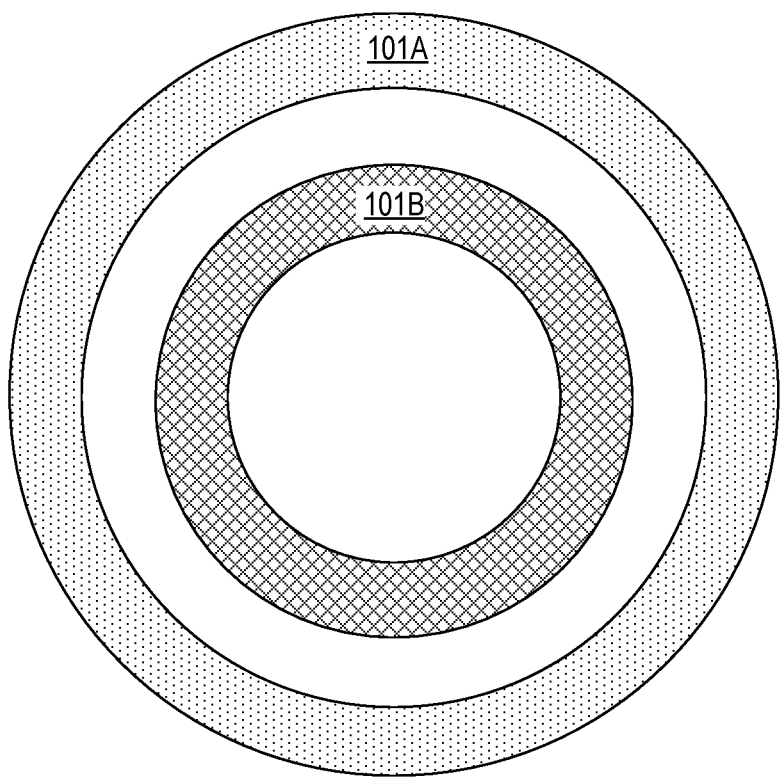
FIG. 1D is an illustration of a cross section of a passive luminescent illuminator, in accordance with an embodiment of the disclosure.

FIG. 1D is an illustration of a cross section of passive luminescent illuminator 100D, in accordance with an embodiment of the disclosure. More specifically, FIG. 1D depicts a cross section of hollow luminescent regions 101A/101B. In this embodiment, luminescent regions 101A/101B, the waveguide, and the extraction region are relatively thin films (e.g., a few millimeters or centimeters thick) which have been rolled to form tubes. Although the depicted tubes have circular cross sections, other cross sectional shapes such as triangular, square, etc. are possible. Further, concentric tubes are utilized to maximize device efficiency. As shown, passive luminescent illuminator 100D includes hollow tubes disposed inside one another. Luminescent region 101A is disposed on the exterior of the device while luminescent region 101B is disposed on the interior. Each tube may have a different semiconductor material which absorbs and emits different wavelengths of light to capture a wider swath of the EM spectrum. Hollow tubes may be flexible (as depicted in other embodiments) and may be coupled to other pieces of device architecture (solid-state or otherwise). Additionally, more than two tubes may be nested inside one other. In other embodiments, three or more tubes may be used to form luminescent illuminator 100D.

Figure 2A:
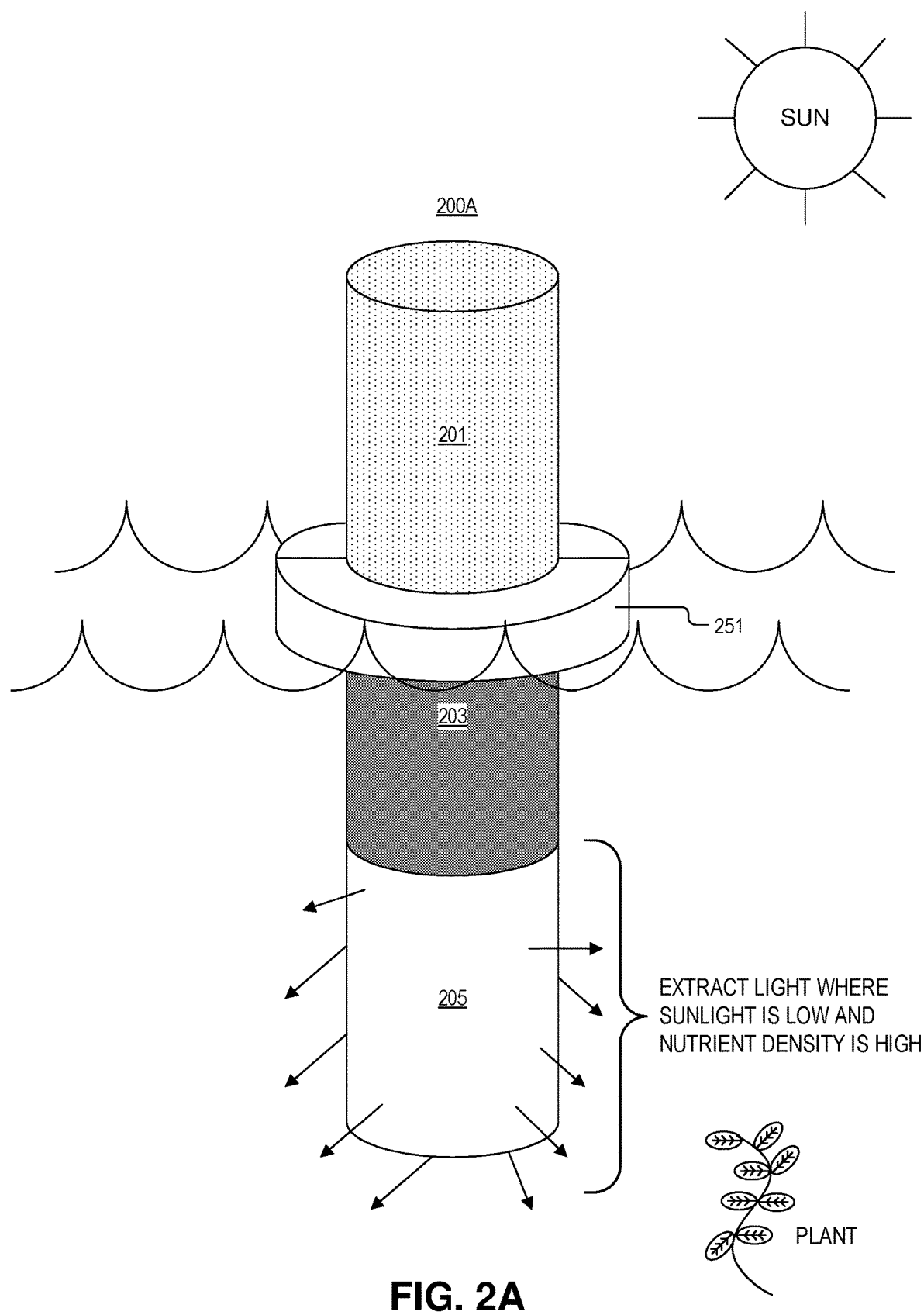
FIG. 2A is an illustration of one use for the passive luminescent illuminators of FIGS. 1A-1D, in accordance with an embodiment of the disclosure.

FIG. 2A is an illustration of one use for the passive luminescent illuminators of FIGS. 1A-1D, in accordance with an embodiment of the disclosure. In the depicted embodiment, the passive luminescent illuminator 200A is used to farm plants disposed underwater such as seaweed, kelp, algae, or the like. Luminescent region 201 is disposed above the surface of the water, and kept buoyant with floatation device 251. As stated in FIG. 2A, farming of plants underwater may be advantageous since nutrients are plentiful and are naturally replenished. Furthermore, passive luminescent illuminator 200A may extend to a depth that sunlight may not normally reach, but where nutrient density is very high. This may allow farming in regions of the ocean previously unable to support a large quantity of plant life.

Although the depicted embodiment shows a simple columnar passive luminescent illuminator 200A, in other embodiments, it may be advantageous to use a branched or highly flexible passive luminescent illuminator 200A (see e.g., FIGS. 1B and 1C). Branched structures may facilitate a larger illuminated area for plants to grow. Additionally, a flexible device may be able to better withstand the pounding of waves without being cracked or destroyed. Furthermore, the dimensions of passive luminescent illuminator 200A may be very different than those depicted. For example, luminescent region 201 may be much wider than the rest of the device to facilitate harvesting the maximum amount of sunlight.

Luminescent illuminator 200A may be free floating or anchored to the sea bed depending on use case. In several embodiments, luminescent illuminator 200A may be coupled to other devices to better facilitate the farming of underwater plants, for instance, luminescent illuminator 200A may be coupled to a GPS locator, cleaning apparatus (or self-cleaning materials) to remove algae/lifeforms from the surface of the device, coating materials to prevent environmental degradation, surrounded by a passive enclosure (low index of refraction) to facilitate wave-guiding underwater, etc.

Figure 2B:
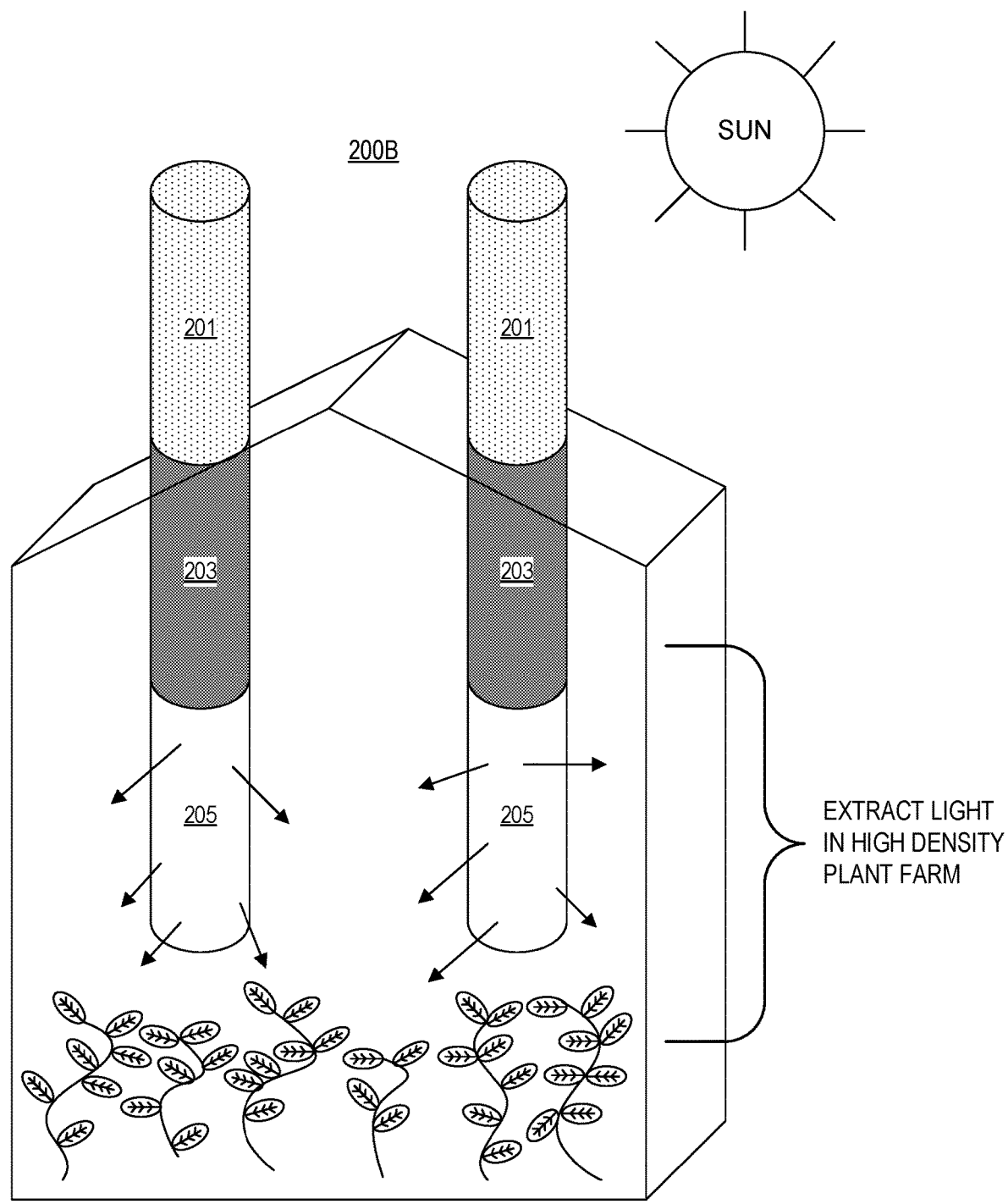
FIG. 2B is an illustration of one use for the passive luminescent illuminators of FIGS. 1A-1D, in accordance with an embodiment of the disclosure.

FIG. 2B is an illustration of one use for the passive luminescent illuminators of FIGS. 1A-1D, in accordance with an embodiment of the disclosure. In the depicted embodiment, luminescent illuminators 200B are disposed on the roof of a high density vertical plant farm. Luminescent illuminators 200B harvest light incident on the roof of the farm and transport second photons generated in luminescent region 101 down into the plant farm. In the depicted embodiment, the wavelengths of the second photons are optimized for plant growth, for example, the second photons may include a majority of photons with energy corresponding to absorption maxima of chlorophyll. Although there are only two luminescent illuminators 200B disposed on the roof of the building depicted in FIG. 2B, in other embodiments, an array of luminescent illuminators 200B may be disposed on the roof of the farm. In this embodiment, the number of luminescent illuminators 200B may number in the thousands. It is worth noting luminescent illuminator 200B may collect a large amount of sunlight relative to the square footage it occupies: luminescent illuminator 200B may be tall and thin so the total active area is large, while the amount of square footage occupied is small in comparison.

Although the depicted example shows a simple columnar passive luminescent illuminator 200B, in other embodiments it may be advantageous to use a branched or highly flexible device (see e.g., FIGS. 1B and 1C). Branched structures may facilitate a larger illuminated area for plants to grow and may run parallel to the rows of plants in the farm. Furthermore, flexible embodiments of luminescent illuminator 200B may allow for simple installation. For example, flexible luminescent illuminators 200B may be routed through an existing building like wiring, with waveguide 103 disposed in the walls, and sockets to plug-in the extraction regions 105. Using light harvested from the sun, the indoor farm may drastically cut the amount of power needed to provide light to all the plants. Furthermore, green photons—which are poorly absorbed by chlorophyll—may be converted into other wavelengths more useful to plants.

Figure 3A:
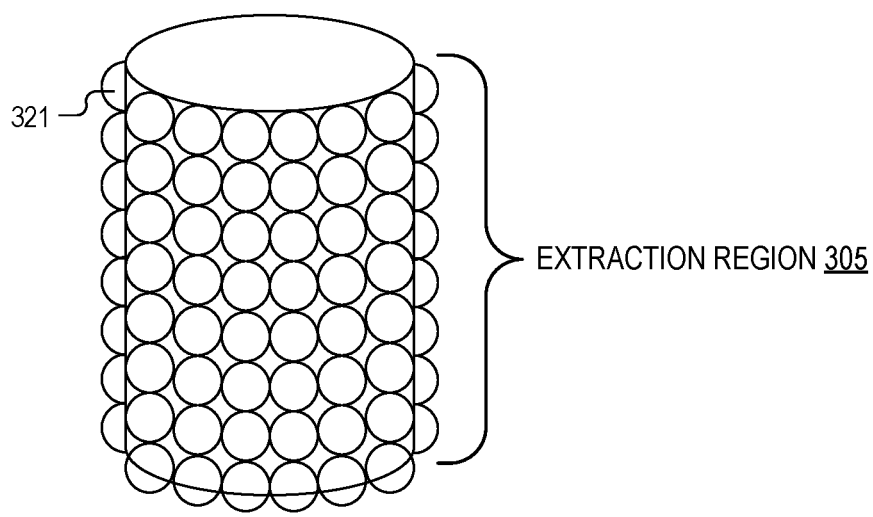
FIGS. 3A-3C illustrate examples of extraction regions, in accordance with several embodiments of the disclosure.
Figure 3B:
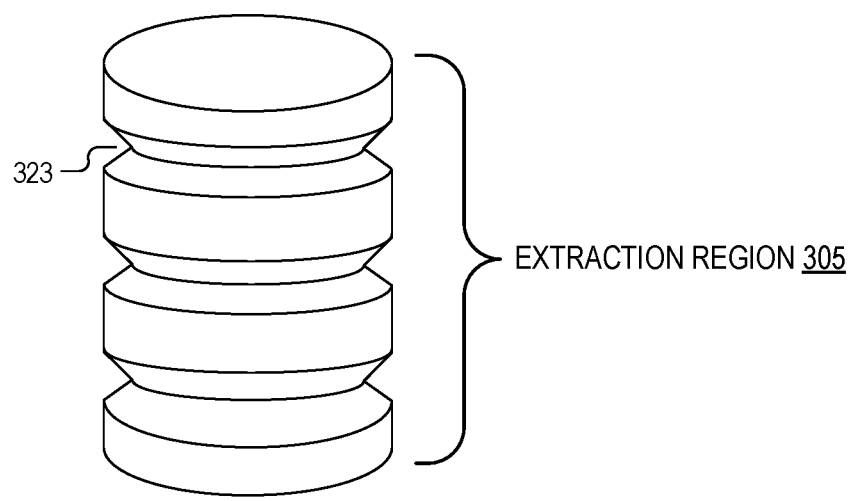
Figure 3C:
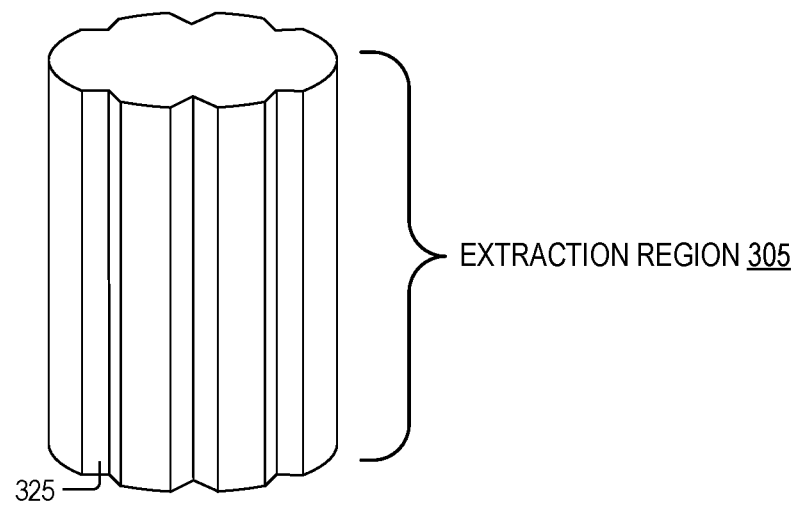

FIGS. 3A-3C illustrate examples of extraction regions 105, in accordance with several embodiments of the disclosure. If conditions for total internal reflection are met within the passive luminescent illuminator, it may be difficult to extract light unless the second photons encounter features which scatter the second photons out of the waveguide. FIGS. 3A-3C depict several extraction regions that are textured to facilitate emission of the second photons from the waveguide. The depicted embodiments should not be deemed limiting as there are any number of materials/structures that may be used to extract second photons from extraction region 305.

FIG. 3A depicts an embodiment of extraction region 305 with a plurality of hemispherical bumps 321 disposed on the surface of extraction region 305. In one embodiment, hemispherical bumps 321 are beads/balls of a material with a different index of refraction than the bulk of extraction region 305 to enhance emission of second photons. In another embodiment, hemispherical bumps 321 may have been molded onto extraction region 305 when extraction region 305 was fabricated.

FIG. 3B illustrates an embodiment of extraction region 305 where horizontal triangular groves 323 have been cut into extraction region 305. In some embodiments, groves 323 may not be triangular and may be square or the like. Groves 323 may have been molded into extraction region 305 or cut into extraction region 305 post-fabrication. Additionally, the pitch, depth, geometry, etc. of groves 323 may be tailored to control the location and magnitude of second photon extraction along extraction region 305.

FIG. 3C illustrates an embodiment of extraction region 305 where vertical triangular groves 325 have been cut into extraction region 305. In some embodiments, groves 325 may not be triangular and may be square or the like. Groves 325 may have been molded into extraction region 305 or cut into extraction region 305 post-fabrication. Additionally, the pitch, depth, geometry, etc. of groves 325 may be tailored to control the location and magnitude of second photon extraction along extraction region 305.

Although not depicted, many other techniques may be used to facilitate light extraction from extraction region 305. While all the embodiments depicted in FIG. 3 show highly ordered structures, in other embodiments, structures may simply include random cuts or abrasions on the surface of extraction region 305 (e.g., from sandpaper, blades, sandblasting, etc.). Furthermore, any of the above stated techniques/structures may be used individually and in combination to texture the surface of extraction region 305.

Figure 4:
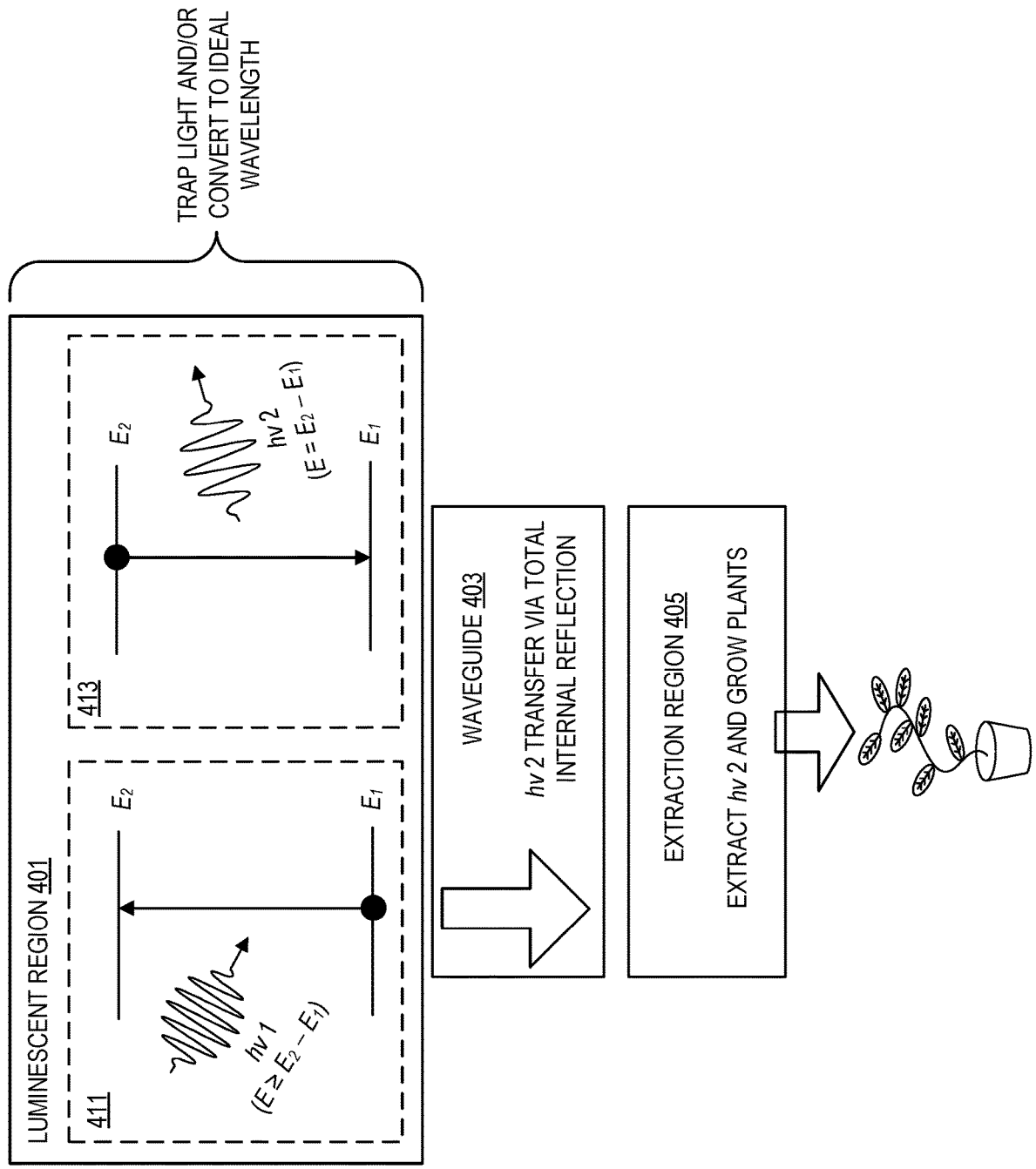
FIG. 4 illustrates the physics underlying the passive luminescent illuminators of FIGS. 1A-1D, in accordance with several embodiments of the disclosure.

FIG. 4 illustrates the physics underlying the passive luminescent illuminators of FIGS. 1A-1D, in accordance with several embodiments of the disclosure. One of ordinary skill in the art having the benefit of the present disclosure will understand that each process depicted may be occurring at the same time when the device is in operation. It is appreciated that absorption and emission of photons is governed by the equation $E=h\nu$, where "E" is the energy of electromagnetic radiation, "h" is Planck's constant, and "$\nu$" is the frequency of electromagnetic radiation. The size of energy gaps depicted and specific energy values are arbitrary and may take any configuration.

In luminescent region 401, block 411 depicts receiving first photons (hv 1) with luminescent region 401, and absorbing the first photons with a semiconductor material disposed in luminescent region 401. The first photons have a first energy greater than or equal to a bandgap energy $(E_2-E_1)$ of the semiconductor material. When absorption occurs, electrons in the semiconductor material are excited into a higher energy state $(E_2)$. In one embodiment, luminescent region 401 is a luminescent concentrator.

Block 413 shows emitting second photons (hv 2) with the semiconductor material. The second photons have a second energy that is less than the first energy. In the depicted embodiment, emission occurs through a spontaneous emission process. In spontaneous emission, the electron falls from $(E_2)$ back down to $(E_1)$ and emits a photon with energy $h\nu=E_2-E_1$. This photon is emitted in a random direction.

The depicted embodiment shows a two-level system, where photons with energy above a minimum energy are absorbed, and photons with energy close to this minimum value are emitted. However, as one skilled in the art will appreciate, photon emission by the semiconductor material may involve electronics states that do not significantly contribute to the absorption behavior of the material. For instance, the semiconductor material may absorb blue and green light, but emit red light. In one embodiment, this may be achieved using a first semiconductor structure—which absorbs shorter wavelengths of light—electronically coupled to a second semiconductor structure—which emits longer wavelengths of light. In another or the same embodiment, the semiconductor material may include a giant-core-shell quantum dot, or a molecule having several dedicated emission centers.

Waveguide 403 is optically coupled to luminescent region 401 and the second photons are transported a distance through waveguide 403. A ray of light can propagate (zigzag) through a transparent dielectric material provided it satisfies the conditions for total internal reflection (TIR). Despite limited loss of photons (satisfying the conditions for TIR) from waveguide 403, waveguide 403 may still be coated with a reflective material or other cladding to further reduce losses stemming from defects in wave guide 403 or other optical scattering initiators.

In extraction region 405, second photons are extracted from the waveguide 403. In the depicted embodiments, plants are disposed proximate to extraction region 405 to absorb the second photons. While much discussion was previously devoted to understanding possible geometries of extraction region 405 (see supra FIGS. 3A-3C and discussion), in some embodiments, extraction region 405 may not be made out of a solid material. For example, in one embodiment where a passive luminescent illuminator is used to grow plants, one end of waveguide 403 (opposite luminescent region 401) may be disposed in a tray of water (used to soak the roots of the plants) to send the second photons into the water. The tray of water may be gently vibrated to produce "texturing" on the surface of water which allows for the extraction of second photons, and illumination of the underside of the plant leaves. This may improve farm efficiency by illuminating both sides of plant leaves using equipment already necessary to grow plants. In the same embodiment, the tray of water may act as both waveguide 403 and extraction region 405, allowing second photons to travel through the water with some second photons exiting due waves on the surface. In other embodiments not depicted, liquids/gasses may be used to satisfy the material constraints of the present disclosure (e.g., luminescent region 401, waveguide 403, and extraction region 405 may include a liquid or gas depending on the desired implementation).

Figure 5:
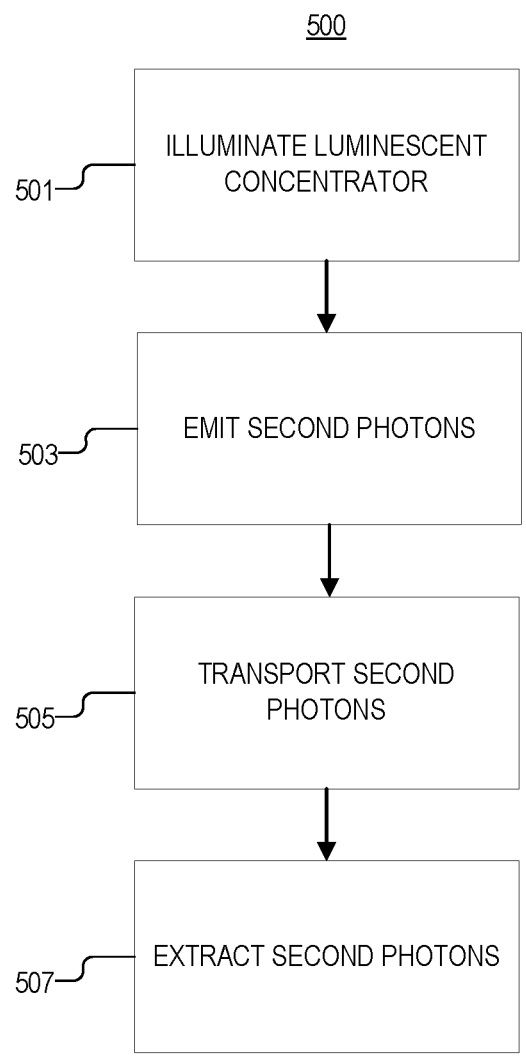
FIG. 5 is a flow chart illustrating a method of passive illumination, in accordance with several embodiments of the disclosure.

FIG. 5 is a flow chart illustrating a method of passive illumination 500, in accordance with several embodiments of the disclosure. The order in which some or all of process blocks 501-507 appear in method 500 should not be deemed limiting. Rather, one of ordinary skill in the art having the benefit of the present disclosure will understand that some of method 500 may be executed in a variety of orders not illustrated, or even in parallel.

Process block 501 depicts illuminating a luminescent concentrator. In one embodiment, this may include illuminating luminescent concentrator with sunlight. The luminescent concentrator includes a semiconductor material that absorbs the first photons. In one embodiment, the luminescent concentrator may include a transparent matrix with quantum dots disposed within it. The transparent matrix may be made from any conventional/commercially available plastic or glass such as PMMA or borosilicate glass. However, in other embodiments, it may be advantageous to use matrix materials with highly elastic properties such as PDMS. The transparent matrix may be continuous and used throughout the waveguide and extraction region. In other embodiments, sections of the luminescent concentrator may be discrete such that each section ends abruptly where another section begins, and no sections overlap or are coextensive. Alternatively, transitions between sections may happen gradually and sections may overlap or be coextensive. Furthermore, an antireflection coating/texturing may be disposed on the surface of the luminescent concentrator to promote absorption of the first photons.

Process block 503 illustrates emitting second photons from the semiconductor material. The second photons have less energy than the first photons. Depending on the semiconductor material employed, the second photons may only have a limited range of wavelengths or may have a very broad range of wavelengths. For example, the bandgap of quantum dots is proportional to the size of the quantum dot. If a narrow range of wavelengths is desired, quantum dots with relatively similar size may be dispersed in the transparent matrix. However if a wider range of wavelengths is desired, quantum dots ranging in size/composition may be disposed in the transparent matrix. Accordingly, the emission profile of the luminescent concentrator may be precisely controlled, as quantum dots with a wide array of sizes/compositions are well studied, commercially available, and easily synthesized.

Process block 505 depicts transporting the second photons a distance through a waveguide optically coupled to the luminescent concentrator. As discussed previously, the waveguide may exhibit total internal reflection and may transport photons very large or very short distances. Furthermore the length and diameter of the waveguide may be tailored to take any shape depending on the desired use case and physical restrictions imposed on the device.

Process blocks 507 shows extracting the second photons from the waveguide in an extraction region. The extraction region is optically coupled to the waveguide. The extraction region may include the same material as the waveguide but with a textured surface. Furthermore, the extraction region may include a plurality of materials with different indices of refraction to scatter light out of the extraction region.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A passive illuminator comprising:
   a luminescent region including a first semiconductor material and a second semiconductor material, wherein the first semiconductor material absorbs first photons having first energy greater than or equal to a first threshold energy, wherein the second semiconductor material absorbs second photons having second energy greater than or equal to a second threshold energy and different from the first energy of the first photons, wherein, in response to absorbing the first photons, the first semiconductor material emits third photons, through a first spontaneous emission process, having less energy than the first photons, wherein the first semiconductor material is structured to emit a majority of the third photons having third energy corresponding to an absorption maxima of chlorophyll, wherein in response to absorbing the second photons, the second semiconductor material emits fourth photons, through a second spontaneous emission process, having less energy than the second photons, wherein the second semiconductor material is structured to emit a majority of the fourth photons having fourth energy corresponding to the absorption maxima of chlorophyll and wherein at least part of the luminescent region includes a hollow tube and an interior tube, wherein the interior tube is disposed within the hollow tube, and wherein the first semiconductor material is disposed in the hollow tube and the second semiconductor material is disposed in the interior tube;

a waveguide structurally attached and optically coupled to the luminescent region to transport the third and fourth photons a distance from the luminescent region; and an extraction region structurally and optically coupled to the waveguide to receive the third and fourth photons from the waveguide and to emit the third and fourth photons, wherein the waveguide is disposed between the extraction region and the luminescent region, wherein a surface of the extraction region is textured to promote extraction of the third and fourth photons.

2. The passive illuminator of claim 1, wherein the luminescent region includes a transparent matrix, and wherein the first semiconductor material includes semiconductor particles disposed in the transparent matrix.

3. The passive illuminator of claim 2, wherein the semiconductor particles have a plurality of bandgap energies and emit the third photons with a plurality of wavelengths.

4. The passive illuminator of claim 3, wherein the semiconductor particles include quantum dots.

5. The passive illuminator of claim 2, wherein the waveguide and the extraction region include the transparent matrix.

6. The passive illuminator of claim 2, wherein the transparent matrix includes at least one of glass or polymers.

7. The passive illuminator of claim 2, wherein the quantum dots include at least one of CdSe, CdSeZn, CdSeS, CdTe, or PbS.

8. The passive illuminator of claim 2, wherein the quantum dots include at least one of giant shell-core quantum dots or dot-in-rod quantum dots.

9. The passive illuminator of claim 1, wherein the first photons include sunlight, and wherein the first threshold energy is equal to a bandgap energy of the first semiconductor material.

10. The passive illuminator of claim 1, further comprising a reflective material disposed on a surface of the waveguide, wherein the reflective material is opaque and prevents third and fourth photons from escaping the waveguide.

11. The passive illuminator of claim 1, wherein the luminescent region, the waveguide, and the extraction region are flexible.

12. The passive illuminator of claim 1, wherein the luminescent region is connected to the waveguide, and the waveguide is connected to the extraction region.

13. The passive illuminator of claim 1, wherein the waveguide exhibits total internal reflection.

14. The passive illuminator of claim 1, wherein the surface of the extraction region is textured to include at least one of hemispherical bumps, groves, cuts, or abrasions.

15. The passive illuminator of claim 1, wherein at least part of the luminescent region and the waveguide include the hollow tube.

16. A method of passive illumination, comprising:
exposing a luminescent concentrator to first photons and second photons, wherein the luminescent concentrator includes a first semiconductor material that absorbs the first photons and a second semiconductor material that absorbs the second photons, wherein the first photons have first energy different from second energy of the second photons, and wherein at least part of the luminescent concentrator includes a hollow tube, wherein the luminescent concentrator includes the hollow tube and an interior tube, wherein the interior tube is disposed within the hollow tube, and wherein the first semiconductor material is disposed in the hollow tube and the second semiconductor material is disposed in the interior tube;

emitting third photons from the first semiconductor material and fourth photons from the second semiconductor material, wherein the third photons and fourth photons have less energy than the first photons and second photons, respectively, and wherein the first semiconductor material and the second semiconductor material are structured to emit a majority of the third photons and the fourth photons having third energy and fourth energy, respectively, corresponding to an absorption maxima of chlorophyll;

transporting the third and fourth photons a distance through a waveguide optically and structurally coupled to the luminescent concentrator; and extracting the third and fourth photons from the waveguide through a textured surface of an extraction region, wherein the extraction region is structurally and optically coupled to the waveguide and the textured surface of the extraction region is textured to facilitate emission of the third and fourth photons from the waveguide.

17. The method of claim 16, wherein the luminescent concentrator, the waveguide, and the extraction region include a continuous transparent matrix to transport the third and fourth photons.

18. The method of claim 17, wherein the continuous transparent matrix is flexible.

19. The method of claim 16, wherein transporting the third and fourth photons includes transporting the third and fourth photons through a plurality of waveguides including the waveguide, and wherein extracting the third and fourth photons includes extracting the third and fourth photons in a plurality of extraction regions including the extraction region.

20. A method of plant farming comprising:
floating, using a floatation device, a passive illuminator in water such that at least a portion of luminescent region of the passive illuminator is above a surface of the water, wherein the floatation device is coupled to a waveguide portion of the passive illuminator;

collecting first photons and second photons with a luminescent concentrator, wherein the luminescent concentrator includes a first semiconductor material that absorbs the first photons and a second semiconductor material that absorbs the second photons, and wherein at least part of the luminescent concentrator includes a hollow tube and an interior tube, wherein the interior tube is disposed within the hollow tube, and wherein the first semiconductor material is disposed in the hollow tube and the second semiconductor material is disposed in the interior tube;

emitting third photons from the first semiconductor material through a first spontaneous emission process and emitting fourth photons from the second semiconductor material through a second spontaneous emission process, wherein the third and fourth photons have less energy than the first and second photons, respectively, and wherein the first and second semiconductor materials are structured to emit a majority of the third and fourth photons having energy corresponding to absorption maxima of chlorophyll;

transporting the third and fourth photons a distance through a waveguide structurally and optically coupled to the luminescent concentrator, wherein transporting the second photons the distance through the waveguide includes transporting the second photons into a depth of water where sunlight does not reach when a top surface of the water is exposed to the sunlight; and extracting the third and fourth photons from the waveguide through a textured surface of an extraction region, wherein the extraction region is structurally and optically coupled to the waveguide and the textured surface of the extraction region is textured to facilitate emission of the second photons from the waveguide, wherein plants are disposed proximate to the extraction region to absorb the second photons.

21. The method of claim 20, wherein the plants are disposed underwater.

22. The method of claim 20, wherein extracting the third and fourth photons in the extraction region includes extracting the third and fourth photons in a plurality of extraction regions including the extraction region.

23. A passive illuminator comprising:
a luminescent region including a first semiconductor material and a second semiconductor material, wherein the first semiconductor material absorbs first photons having first energy greater than or equal to a first threshold energy, wherein the second semiconductor material absorbs second photons having second energy greater than or equal to a second threshold energy, wherein, in response to absorbing the first photons, the first semiconductor material emits third photons, through a first spontaneous emission process, having less energy than the first photons, wherein, in response to absorbing the second photons, the second semiconductor material emits fourth photons, through a second spontaneous emission process, having less energy than the second photons, wherein the first semiconductor material is structured to emit a majority of the third photons having third energy corresponding to an absorption maxima of chlorophyll, wherein the second semiconductor material is structured to emit a majority of the fourth photons having fourth energy corresponding to the absorption maxima of chlorophyll, and wherein at least part of the luminescent region includes a hollow tube and an interior tube, wherein the interior tube is disposed within the hollow tube, and wherein the first semiconductor material is disposed in the hollow tube and the second semiconductor material is disposed in the interior tube;

a waveguide structurally and optically coupled to the luminescent region to transport the third and fourth photons a distance from the luminescent region;

an extraction region structurally and optically coupled to the waveguide to receive the third and fourth photons from the waveguide and to emit the third and fourth photons, wherein the waveguide is disposed between the extraction region and the luminescent region, wherein a surface of the extraction region is textured to facilitate emission of the third and fourth photons from the waveguide; and a floatation device coupled to the waveguide having a buoyancy sufficient to maintain at least a portion of luminescent region above water when the passive illuminator is disposed in the water.

24. The passive illuminator of claim 23, wherein the passive illuminator is disposed in the water, and the waveguide extends into the water to transport the third and fourth photons into a depth of the water where sunlight does not reach.

* * * * *